United States Patent [19]
Geisinger

[11] Patent Number: 5,882,574
[45] Date of Patent: Mar. 16, 1999

[54] INJECTION EXTRUSION BLOW MOLDING PROCESS FOR MAKING MULTIPLE COMPARTMENT PLASTIC CONTAINERS

[75] Inventor: Gregory A. Geisinger, Todedo, Ohio

[73] Assignee: Owens-Brockway Plastic Products Inc., Toledo, Ohio

[21] Appl. No.: 949,188

[22] Filed: Oct. 14, 1997

[51] Int. Cl.⁶ .................................................. B29C 49/04
[52] U.S. Cl. .............................. 264/539; 215/6; 222/555; 425/525
[58] Field of Search ...................................... 264/539, 540, 264/531, 534; 215/6; 220/555; 222/94, 129; 425/525

[56] References Cited

U.S. PATENT DOCUMENTS

| | | |
|---|---|---|
| 2,908,034 | 10/1959 | Hackett . |
| 2,951,264 | 9/1960 | Baily ........................................ 264/540 |
| 3,019,480 | 2/1962 | Soubier . |
| 3,115,682 | 12/1963 | Soubier et al. . |
| 3,144,493 | 8/1964 | Santelli . |
| 3,268,641 | 8/1966 | King ........................................ 264/539 |
| 3,347,420 | 10/1967 | Donoghue . |
| 3,538,543 | 11/1970 | Nataf ........................................ 264/540 |
| 3,729,553 | 4/1973 | Gold et al. . |
| 4,065,536 | 12/1977 | Lucas ........................................ 425/525 |
| 4,548,322 | 10/1985 | Cullen et al. . |
| 5,052,590 | 10/1991 | Ratcliff . |
| 5,114,659 | 5/1992 | Krall ........................................ 264/539 |
| 5,135,702 | 8/1992 | Eales . |
| 5,223,245 | 6/1993 | Ibrahim et al. . |

Primary Examiner—Catherine Timm

[57] ABSTRACT

The multiple compartment plastic container comprises an injection molded finish having a circumferential wall and at least one diametrical wall dividing the finish into at least two passages and an extruded and blow molded body integrally attached to said finish and providing at least two compartments communicating with said passages. The container is made by injection molding a plastic finish having a circumferential wall and at least one diametrical wall dividing the finish in two or more passages, extruding a plastic tube with wall of the tube integral with circumferential wall of the finish and the diametrical wall, closing a blow mold about the tube, and blowing air into the tube through the finish to the confines of the blow mold.

5 Claims, 7 Drawing Sheets

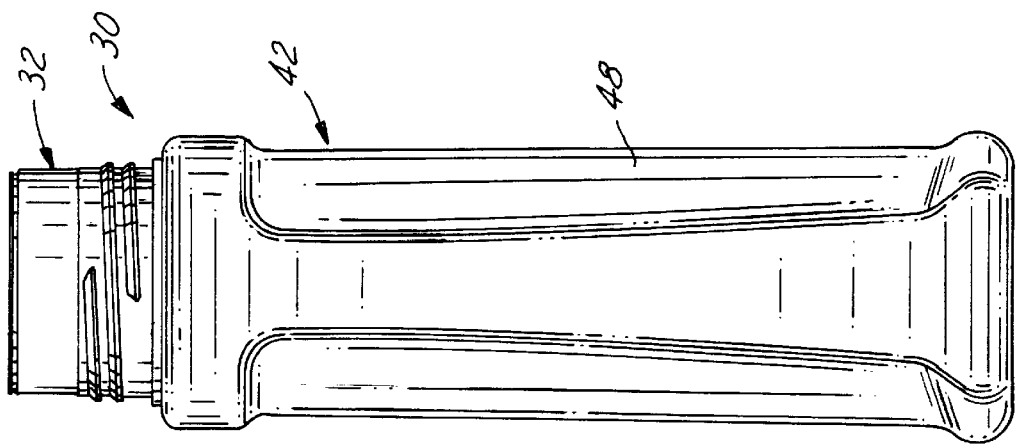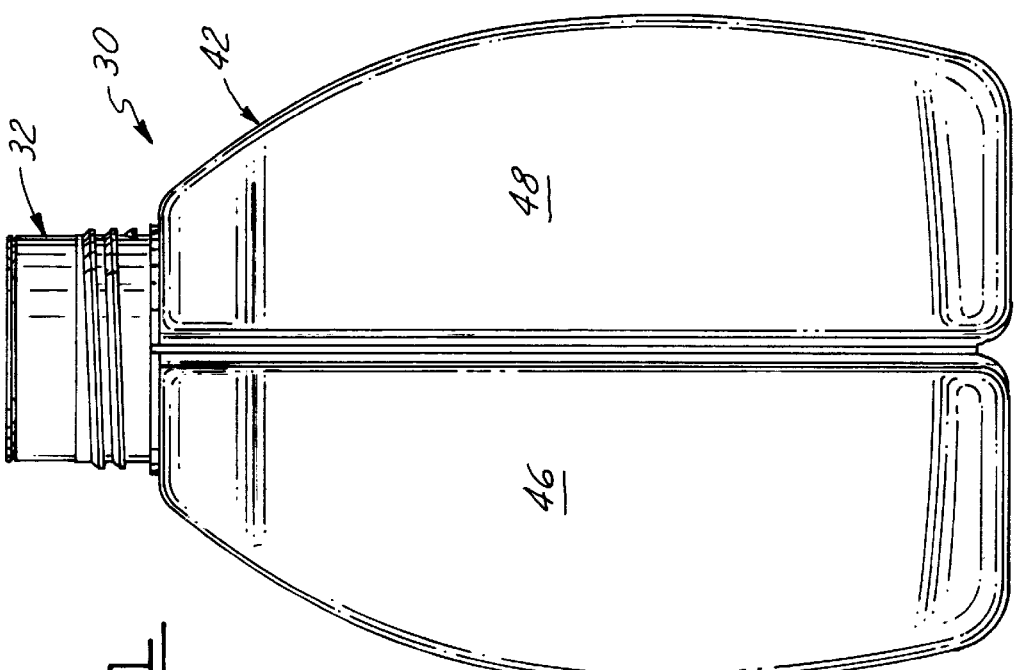

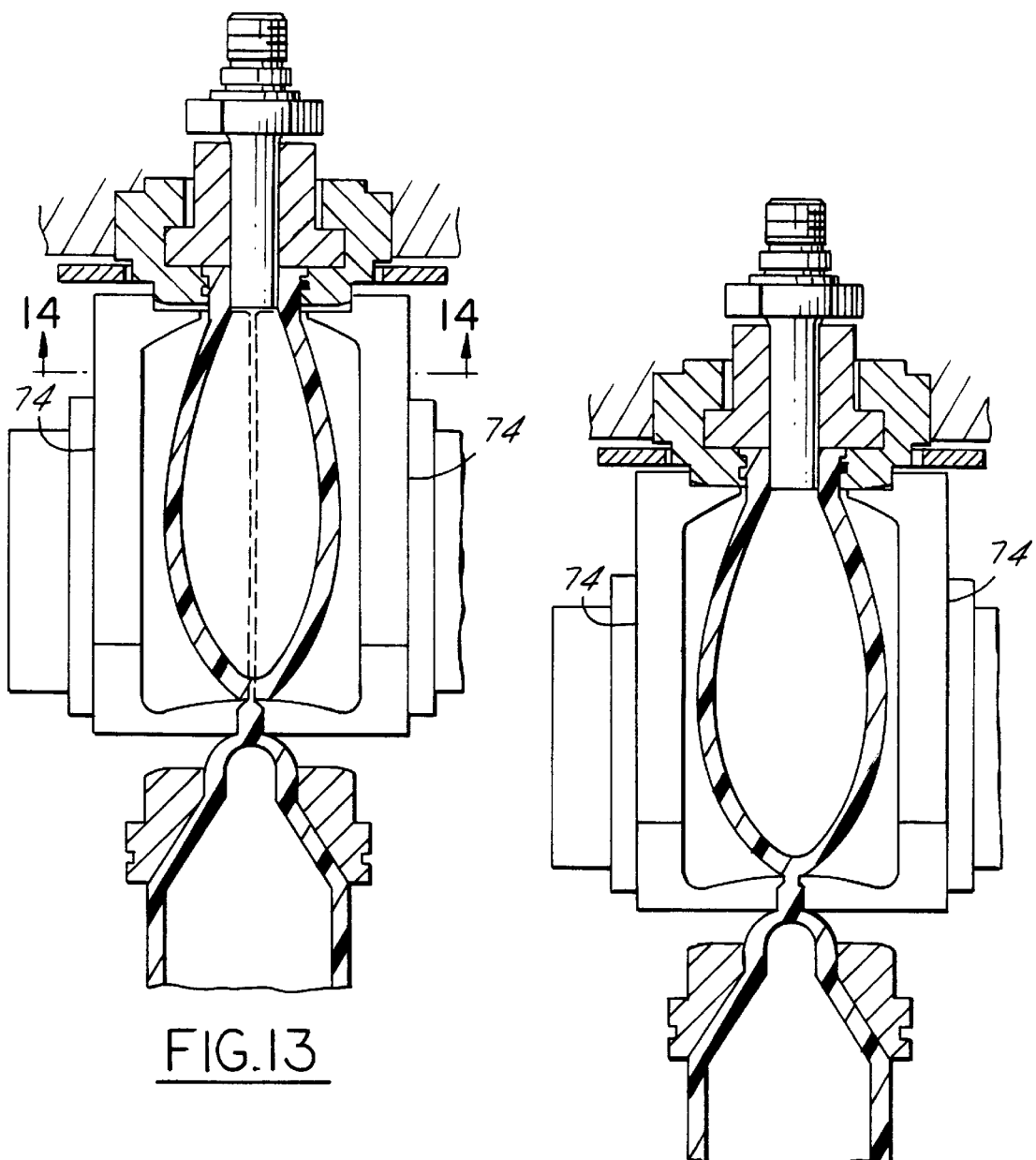
FIG.13
FIG.15
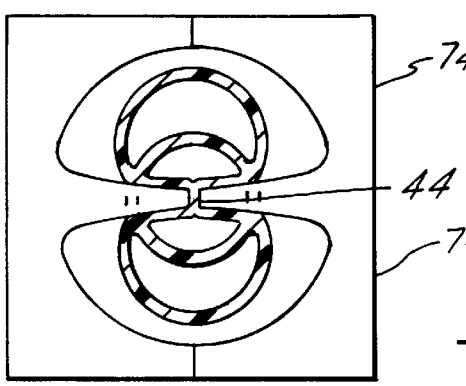
FIG.14

INJECTION EXTRUSION BLOW MOLDING PROCESS FOR MAKING MULTIPLE COMPARTMENT PLASTIC CONTAINERS

This invention relates to multiple compartment plastic containers and a method of making such containers.

BACKGROUND AND SUMMARY OF THE INVENTION

It has heretofore been proposed to make multiple compartment plastic containers with multiple finishes such as shown in U.S. Pat. Nos. 3,729,553; 5,052,590; 5,135,702 and 5,223,245. It has also been proposed to make multiple compartment plastic containers with two halves of a finish which communicate with the multiple compartments as shown in U.S. Pat. No. 3,347,420. U.S. Pat. No. 4,065,536 proposed a single finish having passages communicating with the compartments which is made by injection molding a preform having two compartments which is thereafter blow molded.

Among the objectives of the present invention is to provide an improved multiple compartment plastic container having a single finish with multiple passages communicating with the multiple compartments and a novel method of making the multiple container.

In accordance with the invention, the multiple compartment plastic container comprises an injection molded finish having a circumferential wall and at least one diametrical wall dividing the finish into at least two passages and an extruded and blow molded body integrally attached to said finish and providing at least two compartments communicating with said passages. The container is made by injection molding a plastic finish having a circumferential wall and at least one diametrical wall dividing the finish in two or more passages, extruding a plastic tube with wall of the tube integral with circumferential wall of the finish and the diametrical wall, closing a blow mold about the tube, and blowing air into the tube through the finish to the confines of the blow mold.

Preferably, the step of injection molding the finish comprises providing a neck ring, a finish insert and a mold core including a blow pin within the neck ring. The mold core contour forms the diametrical dividing wall of the finish and the diametrical dividing wall of the finish is oriented by the mounting of the mold core assembly. In accordance with the preferred method, the neck ring is moved relative to the extruder to provide an integral tube and brought into position to form a space between the mold and neck ring prior to closing the mold halves. The neck ring is then lowered to the top of the mold as the molds are closing. The container is blown once the molds are closed and the neck ring head is moved down to the top of the mold. The container is blown through the mold core into all container chambers simultaneously. The mold halves pinch the tube upon closing to provide two chambers which are blown outwardly to form the container. The diametrical dividing wall of the finish is aligned in the same direction as the dividing rib in the mold cavity.

DESCRIPTION OF THE DRAWINGS

FIG. 1 is a front elevational view of a multiple compartment plastic container made in accordance with the invention.

FIG. 2 is a side elevational view.

FIG. 13 is a partly diagrammatic view of the apparatus closing the mold halves about the extruded tube.

FIG. 14 is a sectional view along the line 14—14 in FIG. 13.

FIG. 15 is a partly diagrammatic view of the apparatus showing the neck ring lowered to the top of the mold with the molds closed prior to blowing.

DETAILED DESCRIPTION OF THE PREFERRED EMBODIMENT

Figure 3:
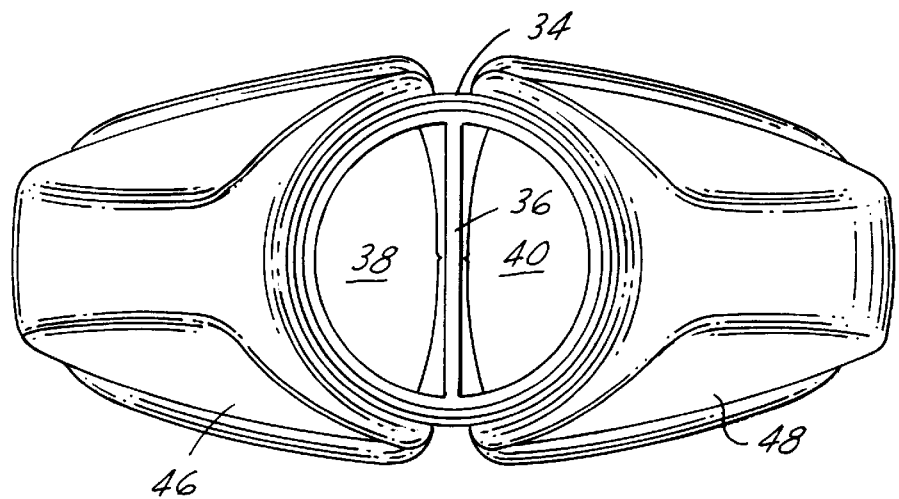
FIG. 3 is a top plan view.
Figure 4:
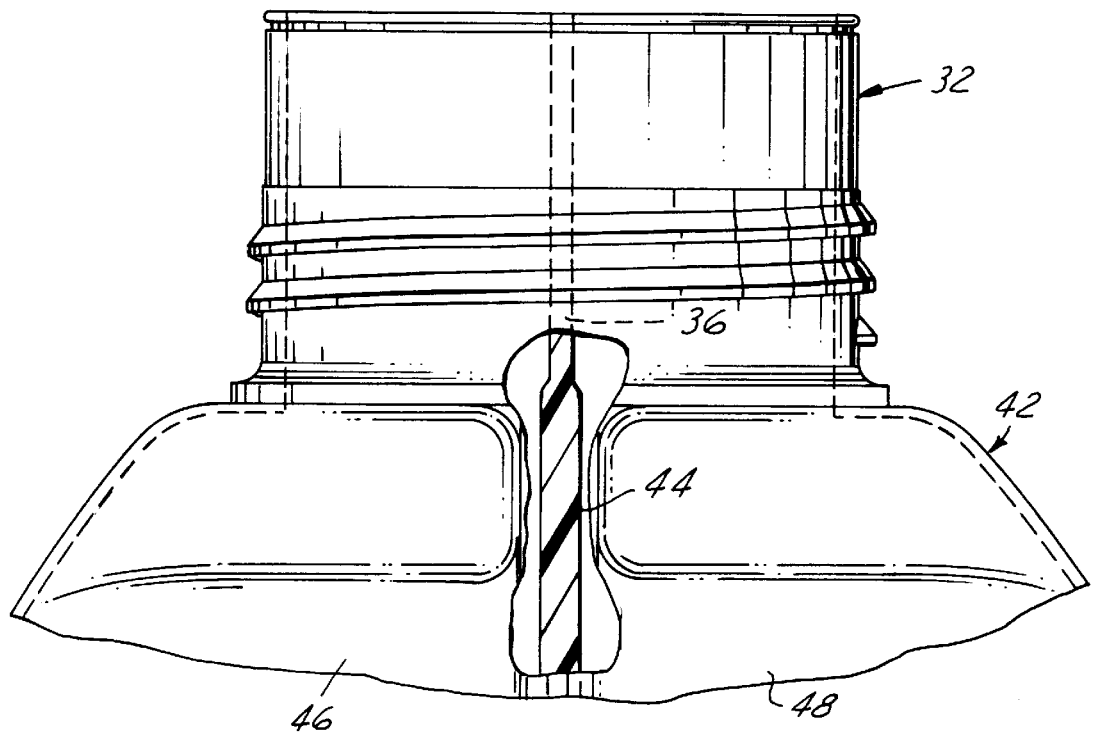
FIG. 4 is a fragmentary elevational view on an enlarged scale of a portion of the container shown in FIG. 1.

Referring to FIGS. 1–4, in accordance with the invention, a multiple compartment plastic container 30 comprises an injection molded finish 32 having a circumferential wall 34 and at least one diametrical wall 36 dividing the finish 32 into at least two passages 38,40. The container 30 includes an extruded and blow molded body 42 integrally attached to the finish 32. The body 42 includes two body portions 46,48 communicating with the passages 38,40. Body portions 46,48 include opposed wall portions that are connected by an integral thin rib 44 which is integrally formed with diametrical wall 36.

The container 30 is made by injection molding the plastic finish 32 with the circumferential wall 34 and diametrical wall 36, extruding a plastic tube with wall of the tube integral with the circumferential wall of the finish, closing a blow mold about the tube, and blowing air into the tube through the finish to the confines of the blow mold.

The method for forming the container is generally of the type known as injection, extrusion blow method such as shown in U.S. Pat. Nos. 2,908,034, 3,019,480, 3,115,682, 3,144,493 wherein a finish is injection molded by positioning a mold core assembly adjacent an extruder, injection molding the finish by utilizing plastic from the extruder, moving the mold core assembly relative to the extruder to extrude an integral tubular parison, closing mold halves about the tube, and blow molding the tube through the mold core assembly. In accordance with the invention, the mold core assembly and mold halves are modified and the relative movement of the apparatus are modified.

Figure 5:
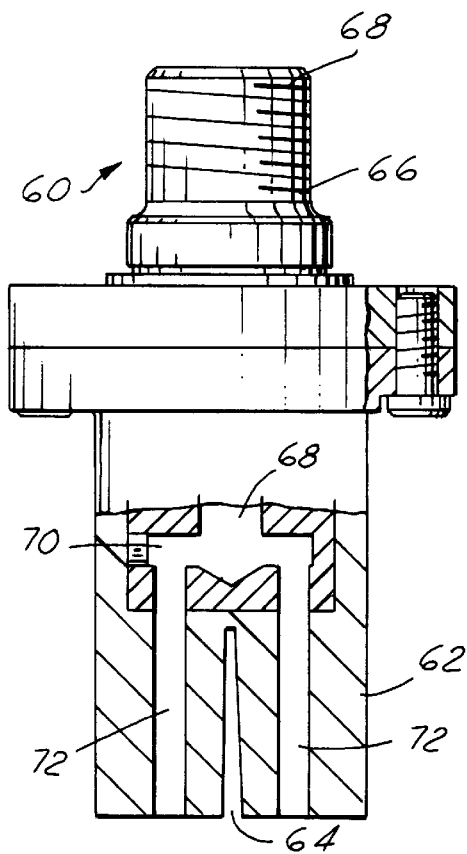
FIG. 5 is a part sectional elevational view of a mold core assembly.
Figure 7:
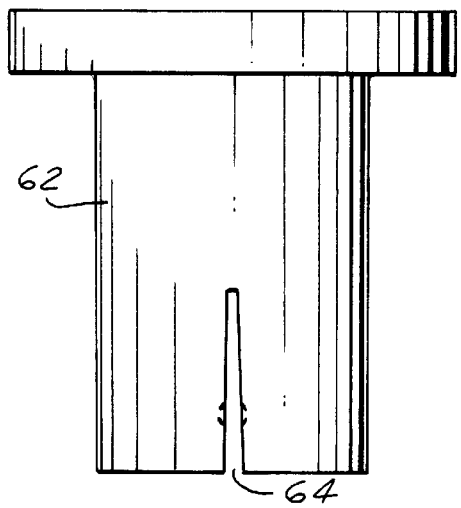
FIG. 7 is an elevational view of the lower portion of the mold core assembly shown in FIG. 6.
Figure 6:
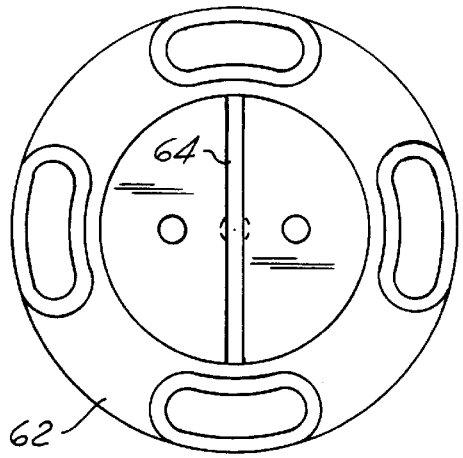
FIG. 6 is a bottom plan view of the lower portion of the mold core assembly.
Figure 9:
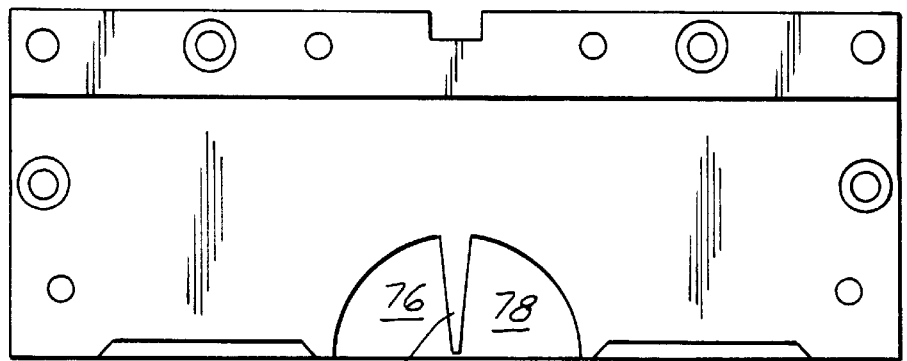
FIG. 9 is a top plan view of the mold half shown in FIG. 8.
Figure 8:
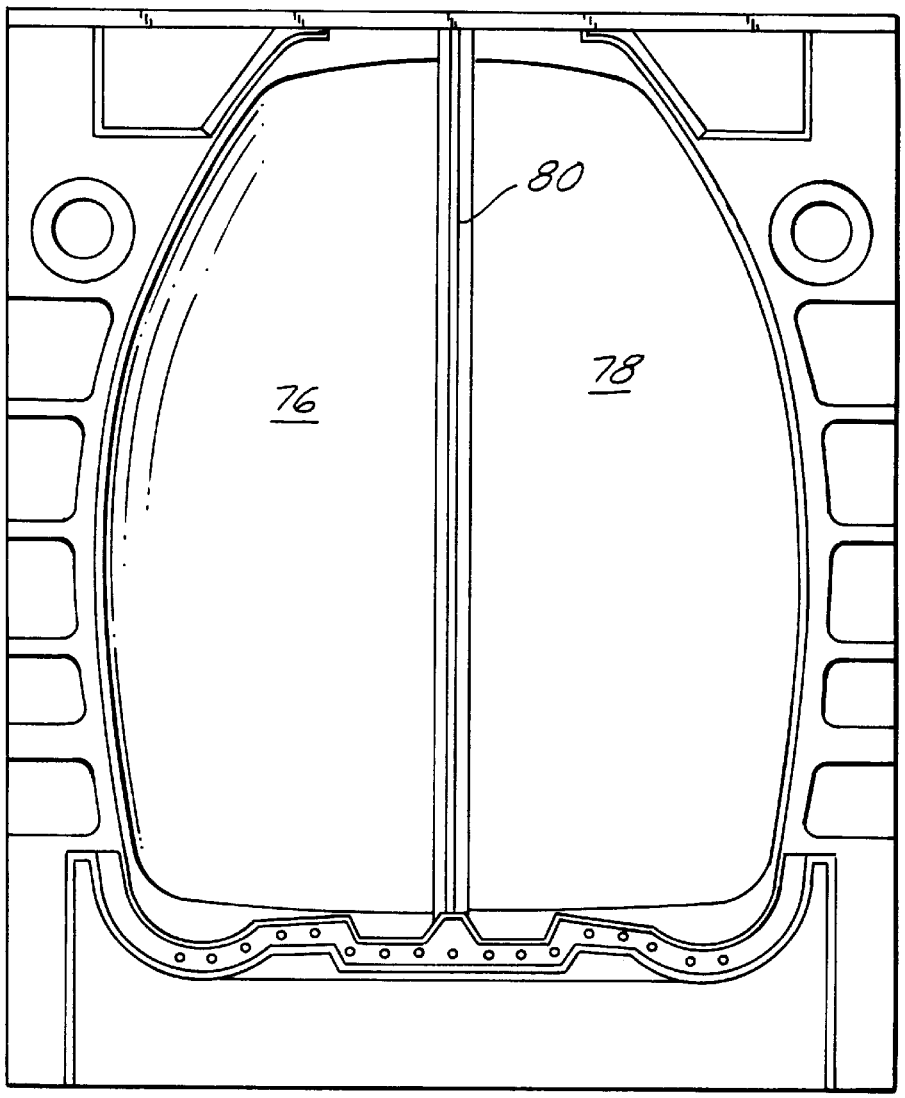
FIG. 8 is an elevational view of a mold half.
Figure 10:
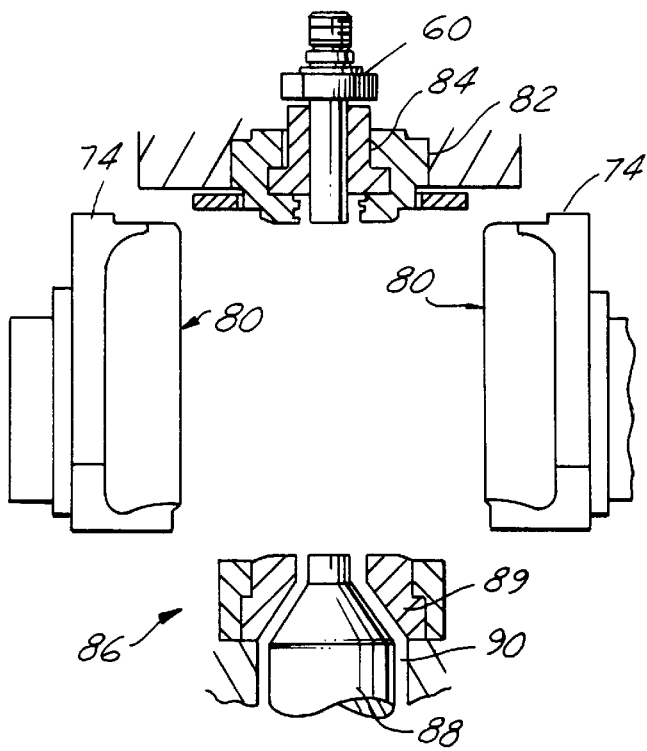
FIG. 10 is a partly diagrammatic view of the apparatus for forming the container in a neutral position.

The step of injection molding the finish comprises providing a neck ring, a finish insert and a mold core including a blow pin within the neck ring. Referring to FIGS. 5–7, the mold core assembly 60 includes a mold core 62 which has a tapered diametrical slot 64 in the free end thereof for forming diametrical wall 36. The core assembly 60 includes a blow air core portion 66 through which blow air is supplied by passage 68 to lateral passages 70 to axial passages 72 for passing the blow air to the passages 38,40 to blow the container. Referring to FIGS. 8 and 9, the blow mold comprises identical blow mold halves 74 which include two cavities 76,78 and a radial rib 80. When the mold halves are closed about the extruded plastic tube which is integral with the injection molded finish 32, the tube is pinched between the opposed ribs 80 to form the thin web 44.

Thus the mold core contour forms the diametrical dividing wall of the finish and the diametrical dividing wall of the finish is oriented by the mounting of the mold core assembly. In accordance with the preferred method, the neck ring is moved relative to the extruder to provide an integral tube and brought into position to form a space between the mold and neck ring prior to closing the mold halves. The neck ring is then lowered to the top of the mold as the molds are closing. The container is blown once the molds are closed and the neck ring head is moved down to the top of the mold. The container is blown through the mold core into all container chambers simultaneously. The mold halves pinch the tube upon closing to provide two chambers which are blown outwardly to form the container. The diametrical dividing wall of the finish is aligned in the same direction as the dividing rib in the mold cavity.

Diagrammatic views shown in FIGS. 10–17 represent the various steps involved in the method. In the neutral position shown in FIG. 10, neck ring 82 supports finish insert 84 and mold core assembly 60 above open mold halves 74 and in axial alignment with an extruder 86. The extruder 86 includes a mandrel 88 and an orifice bushing defining a tubular passage 90 through which plastic can be extruded.

Figure 11:
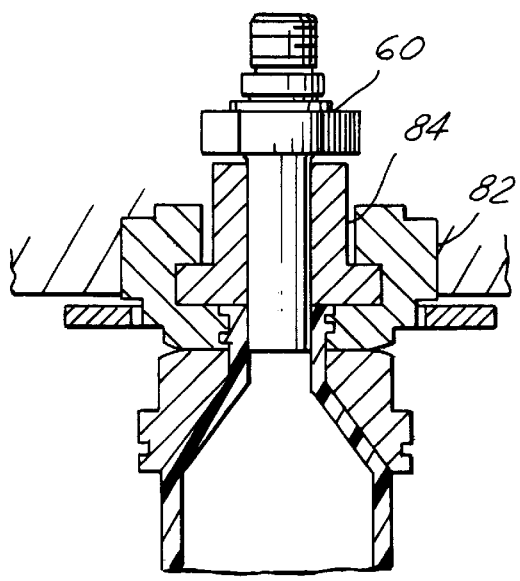
FIG. 11 is a partly diagrammatic view showing the relative positions of the apparatus during injection molding of the finish.
Figure 12:
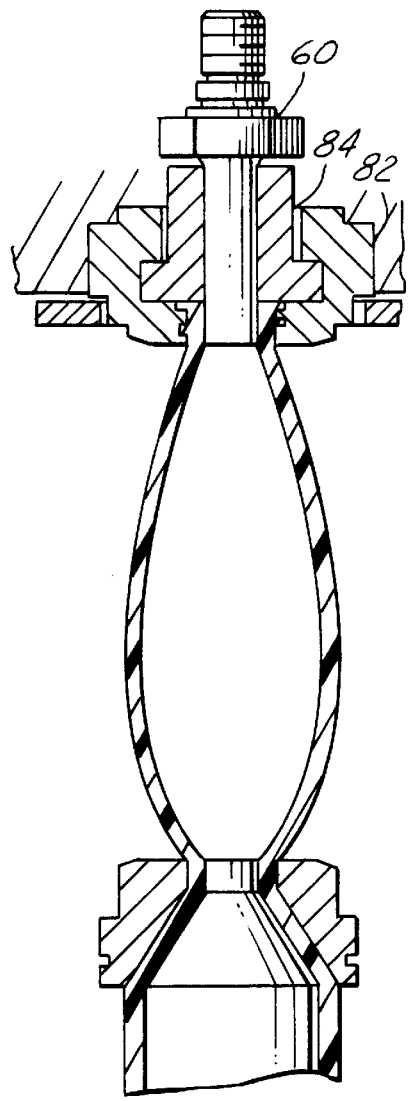
FIG. 12 is a partly diagrammatic view of the apparatus during the extruding of a tube integral with the finish.

The steps of the method are as follows:

1. The neck ring 82 is brought axially downwardly into engagement with the extruder 86 (FIG. 11).

2. Molten plastic is injected from extruder 86 into the cavity to form the finish 32.

3. The neck ring 82 is moved axially upwardly while extrusion of plastic is continued to form a parison P integral with the finish 32.

4. The neck ring 82 is moved axially upwardly to clear the mold halves 74 (FIG. 13).

5. The mold halves 74 are closed about the parison P (FIG. 13) causing the parison P to be pinched to form the thin web 44 and divide the parison P into two connected portions (FIG. 14).

6. The neck ring 82 is moved axially downwardly into contact with the closed mold halves 74 (FIG. 15).

Figure 16:
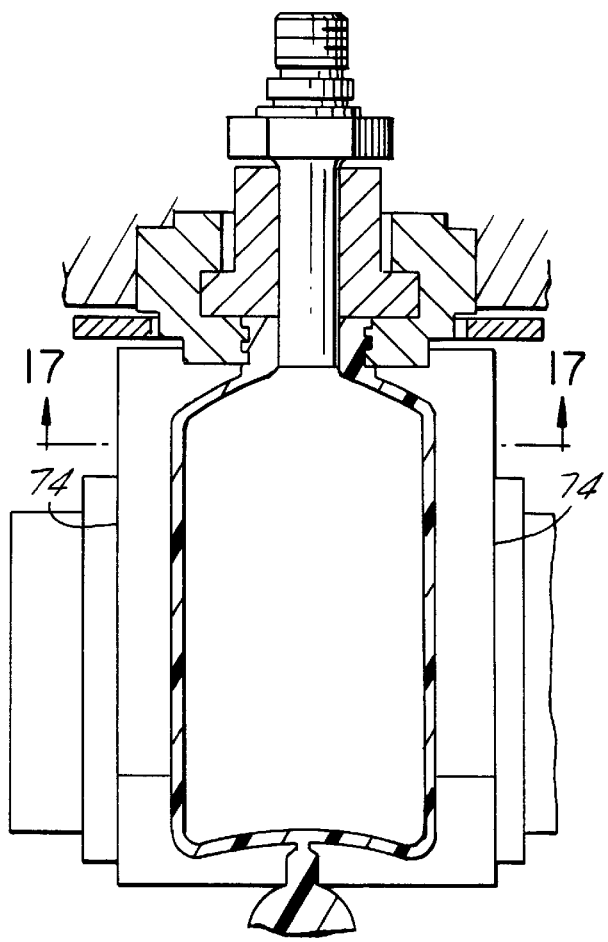
FIG. 16 is a partly diagrammatic view of the apparatus after the container has been formed by blowing.
Figure 17:
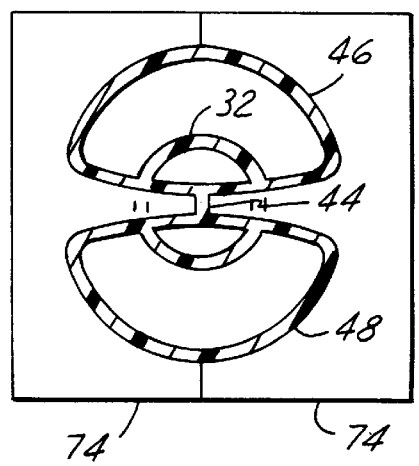
FIG. 17 is a sectional view taken along the line 17—17 in FIG. 16.

7. Blow air is delivered through the core assembly 60 to blow the parison P outwardly to the confines of the closed mold halves and form the container 30 (FIGS. 16,17).

8. Blow air is interrupted to allow the air pressure to exhaust from the container.

9. The blow mold halves 74 are opened.

10. The containers are removed by a take-out mechanism.

It can thus be seen that there has been provided an improved multiple compartment plastic container having a single finish with multiple passages communicating with the multiple compartments and a novel method of making the multiple container.

What is claimed is:

1. The method of forming a multiple compartment plastic container which further comprises injection molding a plastic finish having a circumferential wall and at least one diametrical wall dividing the finish into two passages, extruding a plastic tube integral with said finish, providing blow mold halves, each blow mold half having a radial rib, closing the blow mold halves about said tube and pinching said tube between said ribs to define two separate passages in said tube communicating with the passages in said finish, and a blowing said tube through at least one of said passages in said finish to expand said tube to the confines of the mold to form the container.

2. The method set forth in claim 1 wherein said step of injection molding said finish further comprises providing a neck ring, a finish insert and a core assembly on said neck ring.

3. The method set forth in claim 2 wherein said step of blowing said tube further comprises directing air through said core assembly.

4. The method set fort in claim 3 including moving said core assembly to form a space between the mold halves and said core assembly prior to closing the mold halves and thereafter closing the molds, moving the core assembly into contact with the mold halves and blow molding the container.

5. The method set forth in claim 2 wherein:

a. the neck ring is brought axially downwardly into engagement with an extruder;

b. the injection molding step further comprises injecting molten plastic from an extruder into a cavity defined between said neck ring, said finish insert and said core assembly to form the finish;

c. the extrusion step further comprises moving the neck ring axially upwardly while extrusion of plastic is continued to form said plastic tube integral with the finish;

d. the neck ring is moved axially upwardly to clear the mold halves to form a space;

e. the closing step further comprises closing said mold halves about said tube causing said tube to be pinched to form a thin web and divide said tube into two connected portions;

f. the neck ring is moved axially downwardly into contact with the closed mold halves;

g. the blowing step further comprises delivering blow air through the core assembly to blow said tube outwardly to the confines of the closed mold halves and form the container;

h. blow air is interrupted to allow the air pressure to exhaust from the container;

i. the blow mold halves are opened; and j. the containers are removed.

* * * * *